US009318963B2

United States Patent
Yao et al.

(10) Patent No.: US 9,318,963 B2
(45) Date of Patent: Apr. 19, 2016

(54) SWITCHING POWER CONVERTER WITH SECONDARY TO PRIMARY MESSAGING

(71) Applicant: iWatt Inc., Campbell, CA (US)

(72) Inventors: Jianming Yao, San Jose, CA (US); Pengju Kong, Santa Clara, CA (US); Yong Li, San Jose, CA (US); Junjie Zheng, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 164 days.

(21) Appl. No.: 14/043,593

(22) Filed: Oct. 1, 2013

(65) Prior Publication Data

US 2014/0268919 A1 Sep. 18, 2014

Related U.S. Application Data

(60) Provisional application No. 61/780,231, filed on Mar. 13, 2013.

(51) Int. Cl.
*H02M 1/32* (2007.01)
*H02M 3/335* (2006.01)
*H02M 1/00* (2007.01)

(52) U.S. Cl.
CPC ............ *H02M 3/33523* (2013.01); *H02M 1/32* (2013.01); *H02M 2001/0019* (2013.01); *H02M 2001/0032* (2013.01)

(58) Field of Classification Search
CPC ................................. H02M 1/32; H02M 3/335
See application file for complete search history.

(56) References Cited

U.S. PATENT DOCUMENTS

| | | | |
|---|---|---|---|
| 6,333,624 B1 | 12/2001 | Ball et al. |
| 7,719,860 B2 | 5/2010 | Usu |
| 7,821,797 B2 | 10/2010 | Nishiyama et al. |
| 7,864,546 B2 | 1/2011 | Dhuyvetter et al. |
| 7,911,814 B2 | 3/2011 | Tao |
| 8,018,743 B2 | 9/2011 | Wang |
| 8,125,799 B2 | 2/2012 | Zhu et al. |
| 8,233,292 B2 | 7/2012 | Ren |
| 8,605,462 B2 | 12/2013 | Yang |
| 2002/0027787 A1 | 3/2002 | Nishida |
| 2008/0112193 A1 | 5/2008 | Yan et al. |

(Continued)

FOREIGN PATENT DOCUMENTS

| | | |
|---|---|---|
| CN | 101002375 A | 7/2007 |
| CN | 101841250 A | 9/2010 |
| CN | 102231605 A | 11/2011 |

OTHER PUBLICATIONS

PCT International Search Report and Written Opinion, PCT Application No. PCT/US2014/070978, Mar. 31, 2015, 13 pages.

(Continued)

*Primary Examiner* — Emily P Pham
(74) *Attorney, Agent, or Firm* — Fenwick & West LLP

(57) ABSTRACT

A primary-only power supply enables transmission of a signal or message from the secondary side of an isolated power supply to the primary side. To enable robust detection of the message without interfering with primary side sensing for output regulation, a configurable impedance current path is configured between the primary winding and ground. The primary side controller controls the configurable impedance current path to have a relatively low impedance during the normal mode and a relatively high impedance during the messaging mode.

20 Claims, 6 Drawing Sheets

(56) References Cited

U.S. PATENT DOCUMENTS

| | | |
|---|---|---|
| 2008/0130325 A1 | 6/2008 | Ye |
| 2008/0157743 A1 | 7/2008 | Martin et al. |
| 2008/0192515 A1 | 8/2008 | Huynh |
| 2008/0259655 A1 | 10/2008 | Wei |
| 2009/0015227 A1 | 1/2009 | Wong et al. |
| 2009/0059632 A1 | 3/2009 | Li et al. |
| 2009/0141520 A1 | 6/2009 | Grande |
| 2009/0230930 A1 | 9/2009 | Jain et al. |
| 2009/0279334 A1 | 11/2009 | Xiong et al. |
| 2010/0054000 A1 | 3/2010 | Huynh |
| 2010/0103703 A1 | 4/2010 | Nishiyama et al. |
| 2010/0164455 A1 | 7/2010 | Li et al. |
| 2010/0195355 A1 | 8/2010 | Zheng |
| 2010/0208500 A1 | 8/2010 | Yan |
| 2011/0096572 A1 | 4/2011 | Liang |
| 2011/0096573 A1 | 4/2011 | Zhu |
| 2011/0261596 A1 | 10/2011 | Zong |
| 2012/0051099 A1 | 3/2012 | Funaba |
| 2012/0081927 A1 | 4/2012 | Matsumoto |
| 2012/0176819 A1 | 7/2012 | Gao |
| 2012/0262956 A1 | 10/2012 | DeHaven |
| 2012/0299566 A1 | 11/2012 | Hsu |
| 2013/0088898 A1 | 4/2013 | Gao |
| 2013/0107584 A1 | 5/2013 | Li |
| 2013/0148387 A1 | 6/2013 | Ren |
| 2013/0181635 A1 | 7/2013 | Ling |
| 2013/0235621 A1 | 9/2013 | Yan |
| 2013/0343101 A1 | 12/2013 | Zhang |
| 2014/0016375 A1 | 1/2014 | Gao |
| 2014/0036549 A1 | 2/2014 | Li |
| 2014/0160810 A1* | 6/2014 | Zheng .................. 363/21.17 |
| 2014/0192566 A1 | 7/2014 | Yang |
| 2014/0233269 A1 | 8/2014 | Feng |
| 2014/0268915 A1 | 9/2014 | Kong |
| 2014/0268919 A1 | 9/2014 | Yao |
| 2014/0301116 A1 | 10/2014 | Zhang |
| 2014/0355316 A1 | 12/2014 | Wu |
| 2015/0160270 A1 | 6/2015 | Shi |

OTHER PUBLICATIONS

Chinese First Office Action, Chinese Application No. 201410090425.6. Dec. 23, 2015, 12 pages. (with concise explanation of relevance).

* cited by examiner

SWITCHING POWER CONVERTER WITH SECONDARY TO PRIMARY MESSAGING

RELATED APPLICATIONS

This application claims the benefit of U.S. Provisional Application No. 61/780,231 entitled "Switching Power Converter Secondary to Primary Messaging" to Jianming Yao, et al., filed on Mar. 13, 2013, the contents of which are incorporated by reference herein.

1. TECHNICAL FIELD

The disclosed embodiments relate to a power supply and more particularly to transmission of a message from the secondary side of an isolated power supply to the primary side.

2. DESCRIPTION OF THE RELATED ARTS

In a conventional isolated switching power supply such as a flyback power converter, a switch controller located on the primary side of the power supply regulates power to the load by controlling on-times and off-times of a switch based upon one or more feedback signals representing output power, output voltage, and/or output current. Some isolated power supplies use a secondary-to-primary circuit (commonly employing an opto-isolator device) to communicate feedback signals from the secondary side of the power supply to the primary side controller. Other isolated power supplies instead employ primary-only regulation with the power supply controller relying only on primary-side sensing to obtain the feedback signals used to maintain output regulation. An advantage of using only primary-side sensing is that the power supply can operate without an isolation device such as an opto-isolator that adds significantly to the cost, size, and complexity of the power supply.

SUMMARY

A switching power converter includes secondary-to-primary messaging capabilities. A transformer isolates a primary side of the switching power converter from a secondary side of the switching power converter. The transformer including a primary winding coupled to an input and a secondary winding coupled to an output of the switching power converter. A first primary side switch is coupled to the primary winding of the transformer. The first primary side switch controls current flow through the primary winding based on switching on the first primary side switch. A primary side controller controls switching of the first primary side switch to regulate the output of the switching power converter based on primary-side sensing, and selects between a normal mode and a messaging mode. The primary side controller furthermore detects digital messages generated on the secondary side during the messaging mode based on primary side sensing of a current through the primary winding.

In one embodiment, the primary side controller also controls a configurable impedance current path between the primary winding and ground. Particularly, the primary side controller controls the configurable impedance current path to have a first impedance during the normal mode and a second impedance during the messaging mode, where the second impedance higher than the first impedance.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the inventive subject matter.

DETAILED DESCRIPTION OF EMBODIMENTS

Figure 1:
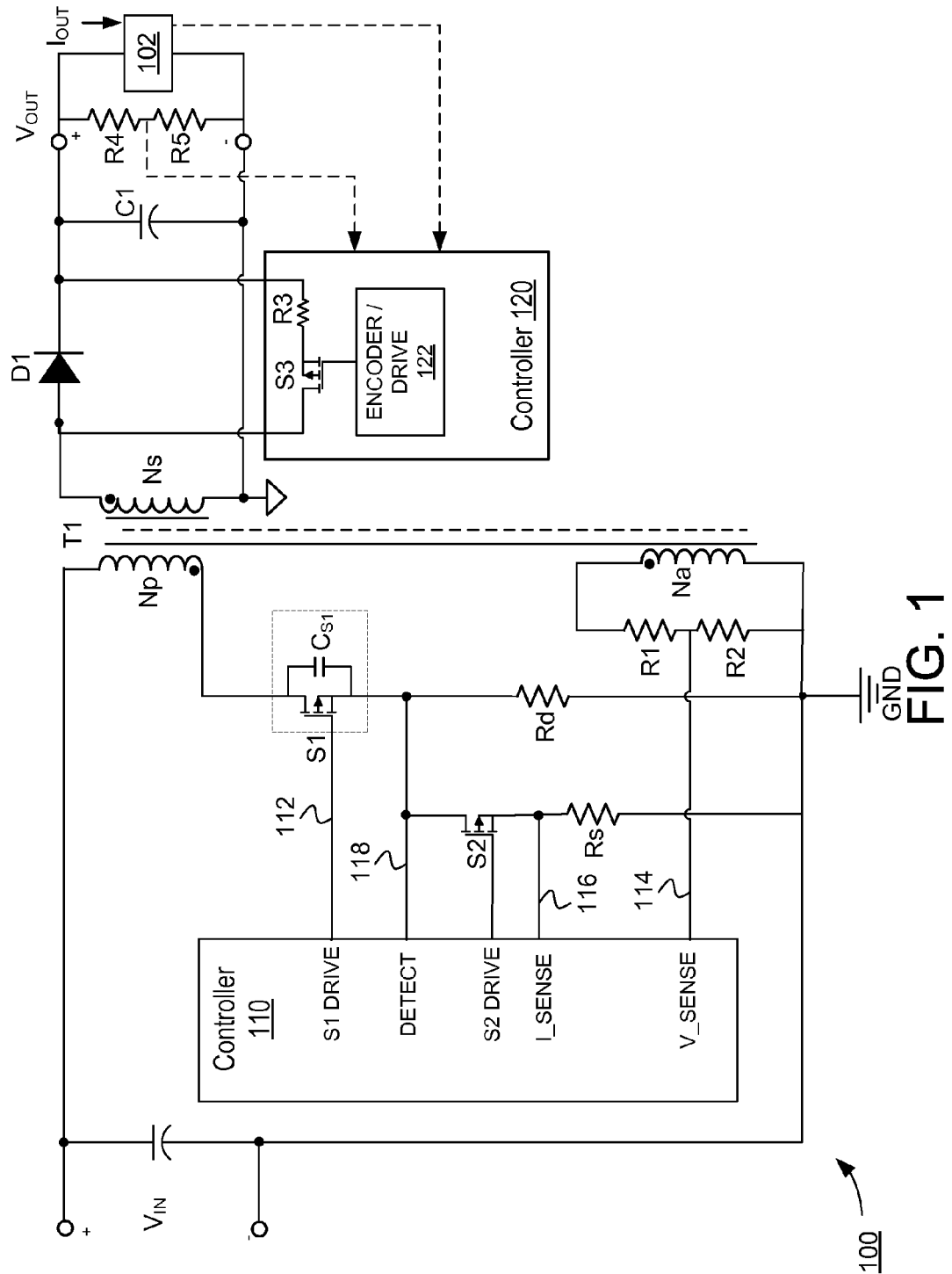
FIG. 1 is a circuit diagram illustrating an embodiment of a switching power converter having secondary-to-primary messaging capabilities.

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

A primary-only power supply enables transmission of a signal or message from the secondary side to the primary side without the use of an optocoupler or similar device. For example, in one embodiment, messages are sent from the secondary side to the primary side to notify the primary side controller of changing secondary conditions such as limited dynamic load changes, over voltage conditions, or under voltage conditions at the output of a switching power converter. In another embodiment, the electronic device coupled to the secondary side of the power supply can transmit a message to the primary side controller indicating a desired operating condition such as voltage setting level and/or a detected fault condition such as an over-temperature condition. The primary side controller can then quickly adapt switching in response to the specific condition. For example, a message may be sent from the secondary side to the primary side when a detector on the secondary side detects that the load has been disconnected. The primary side controller can then decrease switching cycles to very low frequencies in order to maintain the output voltage at a regulated level with minimal power consumption. A message may also be communicated when the load is re-connected to the switching power converter and the output voltage begins to fall. Using feedback regulation alone, a substantial delay would be observed before the primary side controller detects and reacts to the change in output voltage due to the relatively long period between switching cycles. However, using a secondary-to-primary message enables the primary side controller to quickly detect and respond, thus improving dynamic response to changing secondary side conditions.

The messages are detected on the primary side via primary side sensing of a current through the primary winding. To enable robust detection of the message without interfering with primary side sensing for output regulation, a configurable impedance current path is configured between the primary winding and ground. The primary side controller controls the configurable impedance current path to have a relatively low impedance during regular operation and a relatively high impedance during a messaging mode when messages are communicated.

FIG. 1 is a circuit diagram illustrating an embodiment of a switching power converter 100 (e.g., a primary-side fly-back switching power converter) providing power to a load 102 (e.g., an electronic device). An input voltage $V_{IN}$, typically a rectified AC voltage, is input to power converter 100. Primary side controller 110 controls the ON state and the OFF state of power switch S1 using a drive signal with on-times ($T_{ON}$) and off-times ($T_{OFF}$) to maintain a regulated output voltage Vout or regulated output current Iout or both. When power switch S1 is turned on (e.g., closed) during its on-time, energy is stored in the primary winding Np of transformer T1. During the on-time of S1, the voltage across secondary winding Ns of transformer T1 is negative and diode D1 is reverse biased, blocking transfer of energy to load 102. In this state, energy is supplied to load 102 via capacitor C1. When power switch S1 is turned off (opened), the energy stored in primary winding Np 104 is released to secondary winding Ns. Diode D1 becomes forward biased enabling transfer of energy stored in transformer T1 to load 102 and re-charging capacitor C1.

Primary side controller 110 may control switching of switch S1 using a drive signal 112 that implements, for example pulse width modulation (PWM) control or pulse frequency modulation (PFM) control. To achieve the desired output regulation, primary side controller 110 controls switching based on primary side sensing of feedback signals Vsense 114 and Isense 116, where Vsense 114 represents a reflected voltage across an auxiliary winding Na of transformer T1, and Isense 116 represents primary side current through primary winding Np. Using known primary side sensing techniques, controller 110 can approximate output voltage Vout and output current Iout based on measurements of Vsense 114 and Isense 116, thereby enabling controller 110 to maintain regulated output voltage or current.

In one embodiment, Vsense 114 is generated by a voltage divider comprising resistors R1, R2, coupled to auxiliary winding Na of transformer T1. In an alternative embodiment (not shown), Vsense 114 may be derived directly from primary winding Np (e.g., using a voltage divider circuit across primary winding Np).

Furthermore, in one embodiment, Isense 116 is measured when switch S2 is turned on (closed) as a voltage across sense resistor Rs. In one embodiment, sense resistor Rs has a low impedance relative to detection resistor Rd. For example, in one embodiment, sense resistor Rs has an impedance on the order of 1 to 10 Ohms, while detection resistor Rd has a relatively high impedance (e.g., on the order of 1,000 Ohms). Thus, the current through Rs provides a good approximation of the current through primary winding Np when switch S2 is on.

The secondary side controller 120 generates messages for communicating to the primary side controller 110. The messages may encode various secondary side characteristics sensed by secondary side controller 120. For example, the secondary side controller 120 may sense the output voltage Vout (e.g., via voltage divider R4, R5) and encode information related to dynamic load changes (e.g., when an electronic device is re-connected to the switching power converter), over voltage conditions (e.g., when Vout exceeds an over voltage threshold value), or under voltage conditions (e.g., when Vout drops below an under voltage threshold value). In another embodiment, messages may encode information generated by load 102 itself, such as, for example, information identifying an electronic device connected as load 102 or information identifying an operating mode (e.g., low power mode) of an electronic device connected as load 102.

To generate messages, encoder/driver circuit 122 controls switching of switch S3 to couple or decouple Vout to secondary winding Ns according to a pattern of voltage pulses representing the encoded message. In one embodiment, a resistor R3 is coupled in series with switch S3 to prevent a short circuit of output voltage Vout to secondary winding Ns when switch S3 is on. The pulses are reflected on primary winding Np and can be detected on the primary side during a message mode as will be explained in further detail below.

Figure 2:
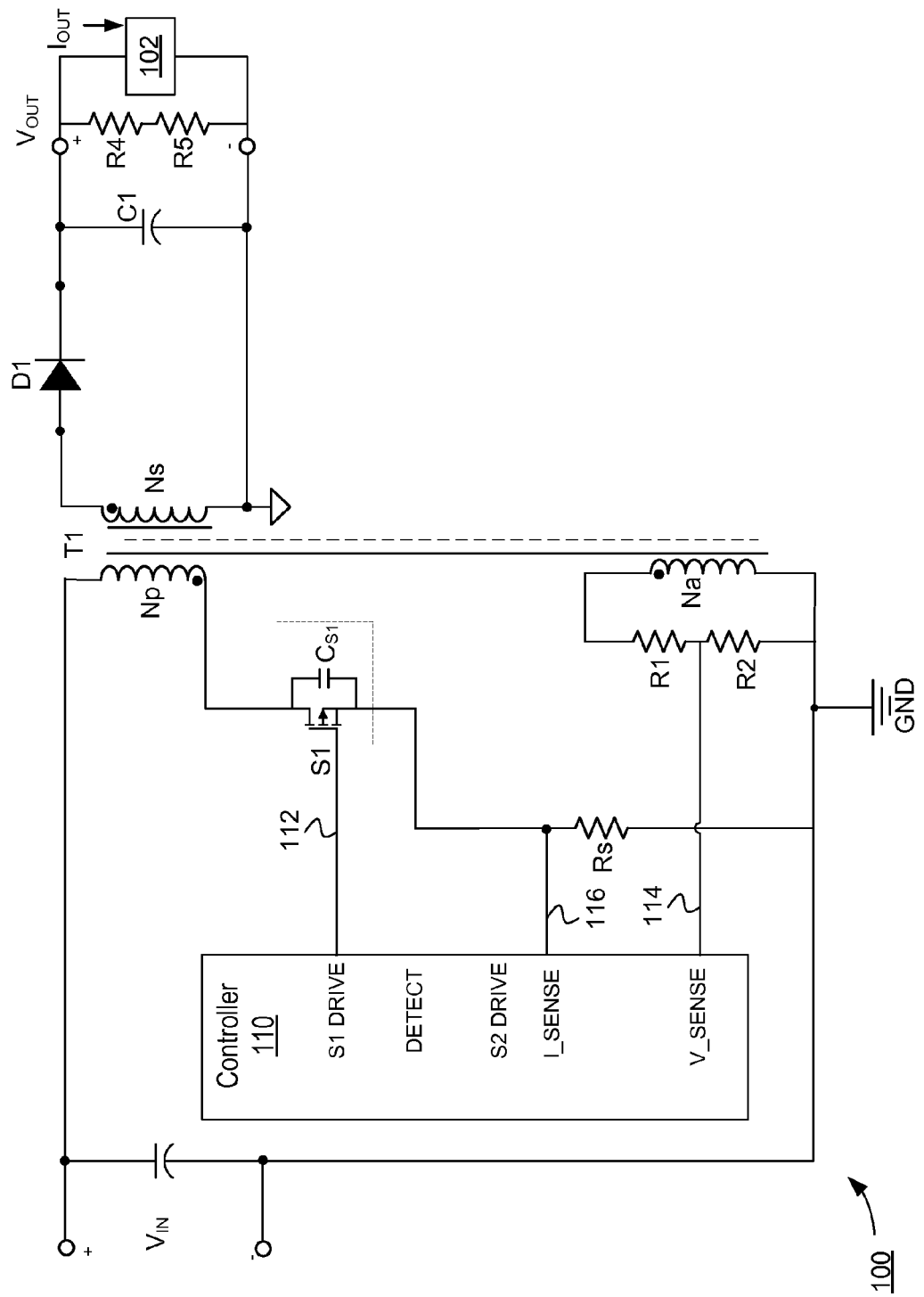
FIG. 2 is a circuit diagram illustrating a circuit approximating a switching power supply having secondary-to-primary messaging capabilities while operating in normal mode.

In one embodiment, controller 110 switches between normal mode and messaging mode by controlling the state of switch S2. During normal mode of controller 110, switch S2 is turned on (closed). Under this condition, sense resistor Rs and detection resistor Rd are connected in parallel and provide a current path from the primary winding Np to ground (GND). FIG. 2 illustrates a circuit that provides an approximation of switching power supply 100 when switch S2 is placed in the ON state (during normal mode). Here, switch S2 is modeled as a short circuit (because the switch is on) and detection resistor Rd is modeled as an open circuit because its impedance is substantially higher than the impedance of sense resistor Rs. Thus, as explained above, the parallel combination of Rs and Rd is approximated by Rs. Secondary controller 120 is also omitted in FIG. 2, since messages are not generated in this mode (i.e., switch S3 remains off). As can be observed from the circuit of FIG. 2, switching power supply 100 operates similarly (or identically) to a flyback power converter during normal mode when switch S2 is on.

Figure 3:
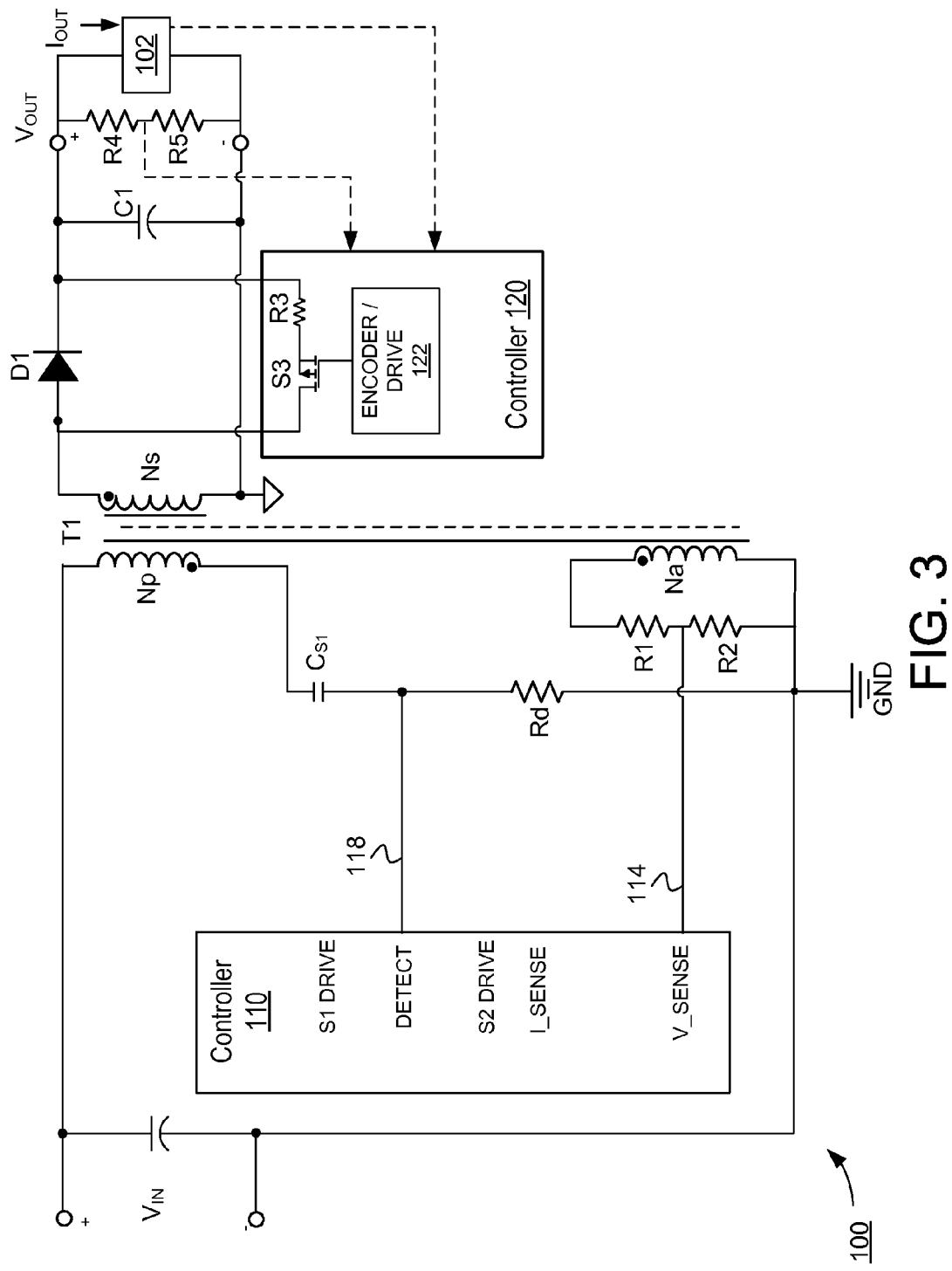
FIG. 3 is a circuit diagram illustrating a circuit approximating a switching power supply having secondary-to-primary messaging capabilities while operating in a messaging mode.

To enable messaging mode, controller 110 turns switch S2 off. Typically, messaging mode is enabled only during the off times of power switch S1. FIG. 3 illustrates a circuit that provides an approximation of switching power supply 100 when switches S1 and S2 are in the OFF state (during message mode). Here, switch S2 and sense resistor Rs are modeled as an open circuit because switch S2 is off. Furthermore, switch S1 is modeled as a capacitor $C_{S1}$ (representing the parasitic capacitance of switch S1) because switch S1 is off. Thus, primary winding Np is coupled to ground via parasitic capacitor $C_{S1}$ and detection resistor Rd.

When voltage spikes are generated on secondary winding Ns during messaging mode, the voltage spikes are reflected on primary winding Np and can be detected by controller 110 as a voltage across detection resistor Rd via detection signal 118. Controller 110 can then decode the message and adjust operation accordingly.

As can observed from FIGS. 1-3, switch S2, sense resistor Rs, and detection resistor Rd collectively form a configurable impedance current path from the primary winding to ground controlled by primary side controller 110. Particularly, when switch S2 is turned on during normal operation, a relatively low impedance path exists from the primary winding to ground and is approximated by the resistance of sense resistor Rs. The particular value of Rs is selected to ensure accurate detection of Isense 116 to estimate current through primary winding Np during normal mode for the purpose of output regulation. When switch S2 is turned off during messaging mode, a relatively high impedance path exists from the primary winding to ground and is approximated by the resistance of detection resistor Rd. This effectively amplifies the voltage produced at detection point 118 during messaging mode relative to the voltage that would be produced using only the sense resistor Rs. Increasing the impedance of this current path during the messaging mode is beneficial to increase the signal-to-noise ratio of the messages and ensure that messages can be accurately detected at detection point 118.

Figure 4:
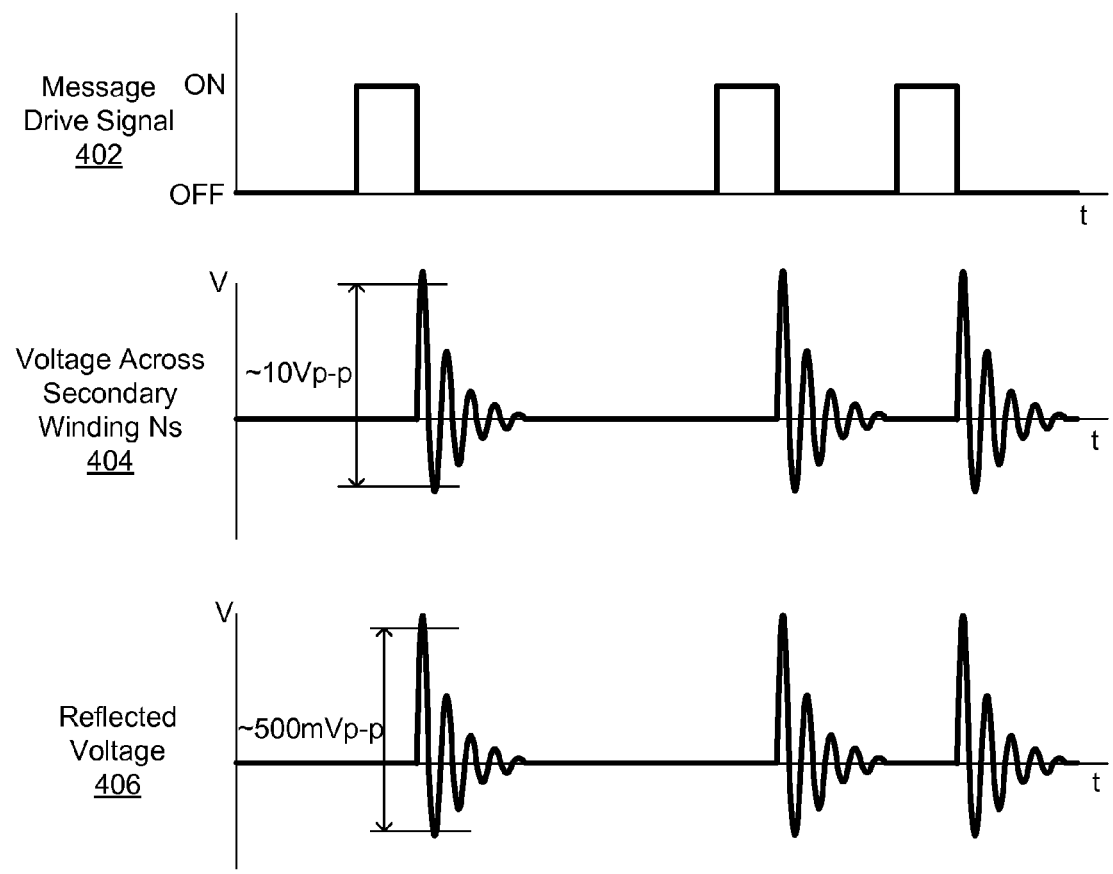
FIG. 4 depicts example waveforms generated by a switching power supply having secondary-to-primary messaging capabilities.

FIG. 4 illustrates examples operational waveforms of switching power supply 100 during messaging mode. For the purpose of example, the depicted waveforms related to a power supply 100 providing an approximately +5 VDC output, although the embodiments are not limited to any particular voltage levels. Message drive signal 402 comprises a series of pulses that control secondary side switch S3. Each ON/OFF pulse in the message drive signal 402 causes a voltage spike across the secondary winding Ns as shown in signal 404, which oscillates and decays due to the inductance and stray capacitance of transformer T1. For example, in one embodiment a 10V peak-to-peak voltage spike in signal 404 is generated across secondary winding Ns in response to each pulse of message drive signal 402. The voltage 404 across the secondary winding Ns is reflected across primary winding Np and generates a reflected voltage 406 across resistor Rd that can be detected by primary side controller 110 as detection signal 118. In one embodiment, the reflected voltage 406 is approximately 500 mV peak-to-peak signal, which provides a high signal-to-noise ratio and results in a reliable signal. In contrast, a conventional primary side architecture using a typical sense resistor Rs (e.g., a circuit in the configuration of FIG. 2) would produce a reflected voltage of only about 10 mV peak-to-peak across sense resistor Rs. Thus, the configurable impedance current path of FIG. 1 beneficially amplifies the message relative to a conventional architecture and enables more reliable detection.

Figure 5:
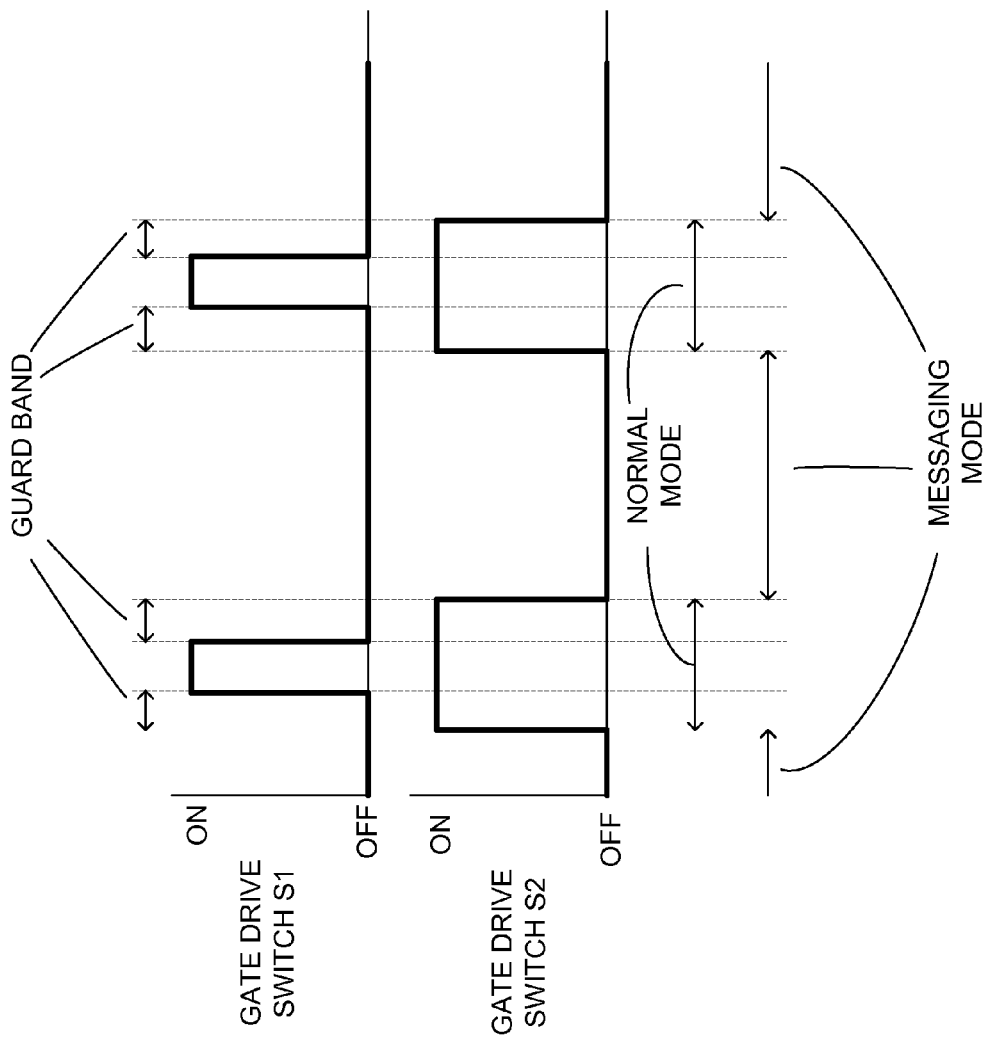
FIG. 5 depicts a timing diagram illustrating example operation of a switching power supply having secondary-to-primary messaging capabilities.

FIG. 5 is a timing diagram illustrating control of the ON and OFF times of switch S1 and switch S2 in one embodiment. As explained above, the ON and OFF cycles of switch S1 are controlled by controller 110 in order to maintain regulation of output voltage Vout or output current Iout. Switch S2 is controlled to be in the ON state whenever switch S1 is in the ON state in order to provide a low impedance path of primary current to ground through current sense resistor Rs and enable reliable sensing of primary side current. During the OFF times of switch S1, primary side controller 110 controls switch S2 to be in the ON state to invoke normal operation mode and control switch S2 to be in the OFF state to invoke messaging mode. In one embodiment, when transitioning from the normal mode to the messaging mode, a guard band period is enforced before switch S2 is turned off after switch S1 turns off. Similarly, when transitioning from the messaging mode to the normal mode, a guard band period is enforced after switch S2 is turned back on prior to turning switch S1 back on. The guard band periods ensure that switch S2 is fully on whenever switch S1 is turned on so that switching of S2 does not interfere with primary side sensing of Isense 116 and Vsense 114. In one embodiment, secondary controller 120 may detect when switch S2 is turned off in order to intelligently determine when to initiate a secondary-to-primary messaging signal. Further, in one embodiment, controller 110 does not necessarily have to place switching power supply 100 in a messaging mode during every off period of switch S1, but instead may do so at varying intervals.

Figure 6:
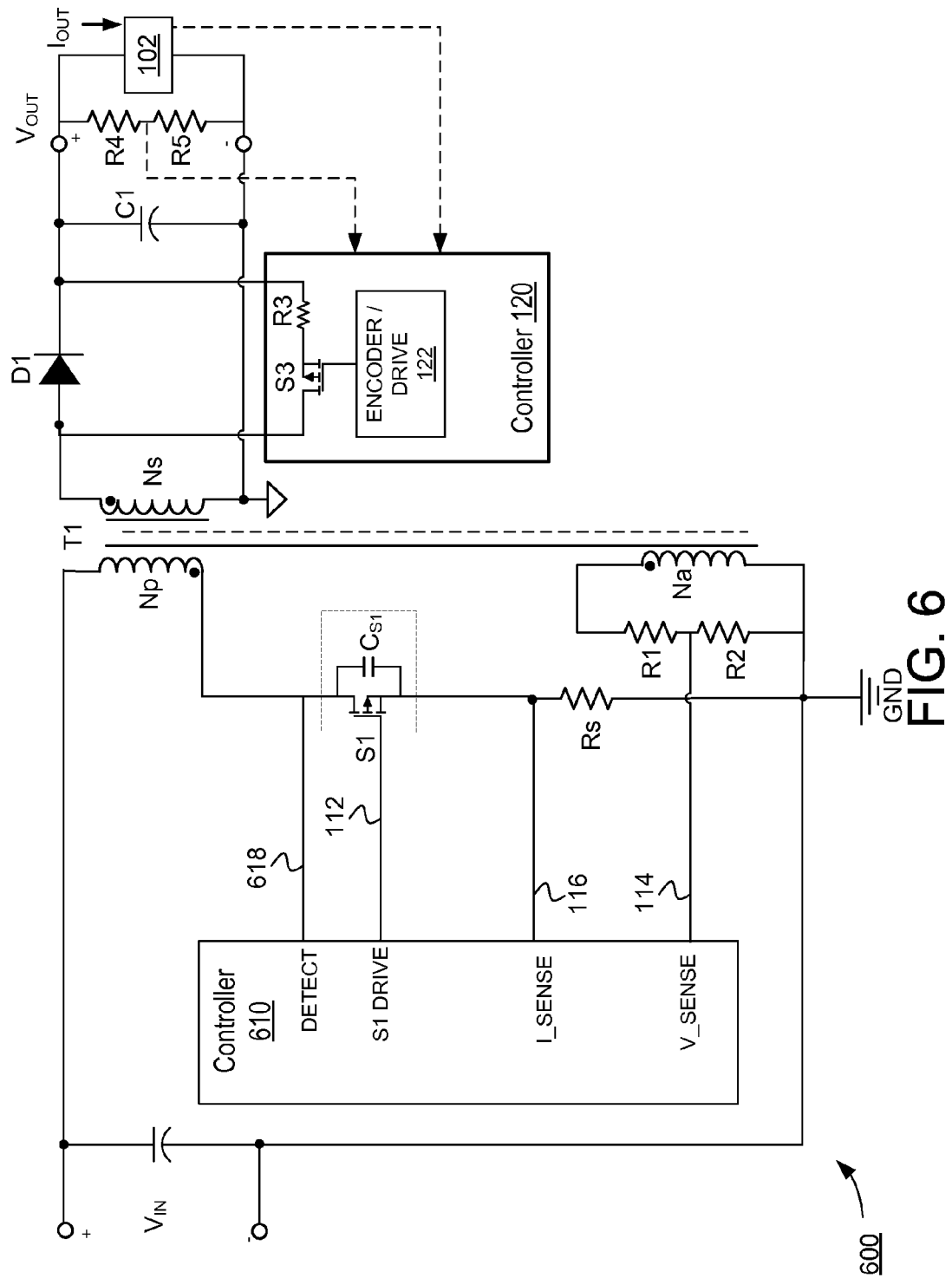
FIG. 6 is a circuit diagram illustrating an alternative embodiment of a switching power converter having secondary-to-primary messaging capabilities.

FIG. 6 illustrates an alternative embodiment of a switching power supply 600 with secondary-to-primary messaging capabilities. This embodiment is similar to the embodiment of FIG. 1, but omits switch S2 and detection resistor Rd. Instead, controller 610 detects messages by sensing a voltage 618 at the junction of primary winding Np and the drain of power switch S1. Assuming that the flyback converter operates with similar parameters to those in the example of FIG. 4 discussed above, the magnitude of the signal 618 is generally a high voltage signal (e.g., on the order of 110V peak-peak) and therefore has a robust signal-to-noise ratio. In order to enable the controller 610 to detect the signal in this high voltage range, a high voltage detection circuit may be used in this embodiment.

In yet another embodiment, controller 610 can detect the message via Isense signal 116. Although this signal will have a relatively low peak-to-peak voltage due to the low resistance of Rs, it can still be sufficient in some conditions to accurately detect the message.

Upon reading this disclosure, those of skill in the art will appreciate still additional alternative designs for a power supply with secondary-to-primary messaging. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the scope of the invention.

The invention claimed is:

1. A switching power converter, comprising:
a transformer isolating a primary side of the switching power converter from a secondary side of the switching power converter, the transformer including a primary winding coupled to an input and a secondary winding coupled to an output of the switching power converter;
a first primary side switch coupled to the primary winding of the transformer, the first primary side switch to control current flow through the primary winding based on switching of the first primary side switch;
a primary side controller to control switching of the first primary side switch to regulate the output of the switching power converter based on primary-side sensing, and to select between a normal mode and a messaging mode, the primary side controller to detect digital messages generated on the secondary side during the messaging mode based on primary side sensing of current through the primary winding.

2. The switching power convert of claim 1, further comprising:
a configurable impedance current path between the primary winding and ground, the primary side controller controlling the configurable impedance current path to have a first impedance during the normal mode and a second impedance during the messaging mode, the second impedance higher than the first impedance.

3. The switching power converter of claim 2, wherein the configurable impedance current path comprises:

a second primary side switch controlled by the primary side controller, the second primary side switch to switch between a first state during the normal mode to cause the configurable impedance current path to have the first impedance, and a second state during the messaging mode to cause the configurable impedance current path to have the second impedance.

4. The switching power converter of claim 3, wherein the configurable impedance current path further comprises:
a sense resistor in series with the second primary side switch, the sense resistor providing a first current path from the primary winding to ground when the second primary side switch is turned on;
a detection resistor in parallel with a series combination of the second primary side switch and the sense resistor, the detection resistor providing a second current path from the primary winding to ground when the second primary side switch is turned off.

5. The switching power converter of claim 1, further comprising:
a secondary side controller on the secondary side of the switching power converter, the secondary side controller configured to cause a sequence of voltage spikes across the secondary winding of the switching power converter representing the digital message during the messaging mode of the switching power converter, the sequence of voltage spikes reflected on the primary winding;
wherein the primary side controller detects the sequence of voltage spikes reflected on the primary winding.

6. The switching power converter of claim 5, further comprising:
a secondary side switch coupled to the secondary winding of the transformer, wherein the secondary side switch generates a voltage spike across the secondary winding of the transformer when the secondary side switch is pulsed on and off.

7. The switching power converter of claim 6,
wherein the secondary side controller controls switching of the secondary side switch via a secondary side control signal to couple or decouple an output voltage of the switching power converter to the secondary winding.

8. The switching power converter of claim 1, wherein during the normal mode, the primary side controller detects a current sense signal representing current through the primary side winding and controls switching of the first primary side switch based on the current sense signal.

9. The switching power converter of claim 1, wherein the primary side controller controls switching of the second primary side switch to operate in the normal mode when the first primary side switch is on and to operate in the messaging mode during at least a portion of the off-times of the first primary side switch.

10. The switching power converter of claim 9, wherein the primary side controller controls switching turns off the second primary side switch to enter the messaging mode after a first guard band period following turning off the first primary side switch, and the primary side controller turns on the second primary side switch to enter the normal mode prior to a second guard band period before turning on the first primary side switch.

11. The switching power converter of claim 1, wherein the digital message comprises at least one of: information identifying a transient load condition information identifying an under voltage condition at the load, and information identifying an over voltage condition at the load.

12. A method for controlling a switching power converter, the switching power converter including a transformer with a primary winding coupled to an input and a secondary winding coupled to an output of the switching power converter, and a first primary side switch coupled to the primary winding of the transformer, the transformer electrically isolating a primary side of the switching power converter corresponding to the primary winding and a secondary side of the switching power converter corresponding to the secondary winding, the first primary side switch controlled by a primary side switch controller, the method comprising:
sensing by the primary side switch controller, primary side feedback signals generated on the primary side of the switching power converter;
controlling, by the primary side switch controller, switching of the first primary side switch based on the primary side feedback signals;
selecting between operating the primary side switch controller in a normal mode and a messaging mode; and
detecting a digital message reflected on the primary winding from the secondary winding during the messaging mode, the digital message detected via primary side sensing of a current through the primary winding.

13. The method of claim 12, further comprising:
controlling, by the primary side switch controller, a configurable impedance current path between the primary winding and ground to have a first impedance during a normal mode and a second impedance during a messaging mode, the second impedance higher than the first impedance.

14. The method of claim 12, further comprising:
generating a sequence of voltage spikes across the secondary winding of the switching power converter representing the digital message during the messaging mode of the switching power converter, the sequence of voltage spikes reflected on the primary winding;
wherein detecting the digital message comprises detecting the sequence of voltage spikes reflected on the primary winding.

15. The method of claim 14, wherein generating the sequence of voltage spikes comprises:
controlling switching of a secondary side switch to couple or decouple an output voltage of the switching power converter to the secondary winding.

16. The method of claim 12, further comprising:
during the normal mode, detecting a current sense signal representing current through the primary side winding when the current path has the first impedance; and
controlling switching of the first primary side switch based on the current sense signal.

17. The method of claim 12, further comprising:
controlling switching of the second primary side switch to operate in the normal mode when the first primary side switch is on and to operate in the messaging mode during at least a portion of the off-times of the first primary side switch.

18. The method of claim 17, further comprising:
entering the messaging mode after a first guard band period following turning off the first primary side switch;
entering the normal mode prior to a second guard band period before turning on the first primary side switch.

19. The method of claim 12, wherein the digital message comprises at least one of: information identifying a transient load condition information identifying an under voltage condition at the load, and information identifying an over voltage condition at the load.

20. A switching power converter, comprising:

a transformer including a primary winding coupled to an input and a secondary winding coupled to an output of the switching power converter;

a first primary side switch coupled to the primary winding of the transformer, the first primary side switch to control current flow through the primary winding based on switching the first primary side switch;

a second primary side switch switching between a first state during a normal mode and a second state during a messaging mode, wherein the second primary side switch causes a current path through the primary side winding and the first primary side switch to have a first impedance when the second primary side switch is in the first state during the normal mode, and wherein the second primary side switch causes the current path through the primary side winding and the first primary side switch to have a second impedance when the second primary side switch is in the second state during the messaging mode, the second impedance higher than the first impedance;

a primary side controller on the primary side of the switching power converter, the primary side controller to control switching of the first primary side switch, to control switching of the second primary side switch to select between the normal mode and the messaging mode, and to detect a digital message reflected on the primary winding from the secondary winding during the messaging mode.

* * * * *